United States Patent
Schmitz-Hübsch et al.

(10) Patent No.: US 11,867,804 B2
(45) Date of Patent: Jan. 9, 2024

(54) APPARATUS AND METHOD FOR MEASURING PRECIPITATION

(71) Applicant: G. LUFFT MESS-UND REGELTECHNIK GMBH, Fellbach (DE)

(72) Inventors: Axel Schmitz-Hübsch, Remseck (DE); Matthias Tonnier, Stuttgart (DE)

(73) Assignee: OTT HydroMet Fellbach GmbH, Fellbach (DE)

( * ) Notice: Subject to any disclaimer, the term of this patent is extended or adjusted under 35 U.S.C. 154(b) by 334 days.

(21) Appl. No.: 16/343,672

(22) PCT Filed: Oct. 20, 2016

(86) PCT No.: PCT/EP2016/075157
§ 371 (c)(1),
(2) Date: Apr. 19, 2019

(87) PCT Pub. No.: WO2018/072826
PCT Pub. Date: Apr. 26, 2018

(65) Prior Publication Data
US 2020/0057156 A1 Feb. 20, 2020

(51) Int. Cl.
*G01S 13/95* (2006.01)
*G01S 7/41* (2006.01)
(Continued)

(52) U.S. Cl.
CPC ............ *G01S 13/951* (2013.01); *G01S 7/415* (2013.01); *G01S 13/58* (2013.01); *H01Q 1/42* (2013.01);
(Continued)

(58) Field of Classification Search
None
See application file for complete search history.

(56) References Cited

U.S. PATENT DOCUMENTS

| | | | | |
|---|---|---|---|---|
| 4,660,038 A | * | 4/1987 | Greneker, III | ........ G01S 13/951 342/115 |
| 4,806,932 A | * | 2/1989 | Bechtel | ................. G01S 7/4052 342/6 |

(Continued)

FOREIGN PATENT DOCUMENTS

| | | | | |
|---|---|---|---|---|
| CN | 101351725 A | | 12/2006 | |
| DE | 10305139 A1 | * | 8/2004 | ........... G01S 13/951 |

(Continued)

OTHER PUBLICATIONS

Preez, J. & Sinha, S. Millimeter-Wave Antennas: Configurations and Applications, Jun. 20, 2016, Springer, p. 96-97 (Year: 2016).*

(Continued)

*Primary Examiner* — Timothy A Brainard
*Assistant Examiner* — Ismaaeel A. Siddiquee
(74) *Attorney, Agent, or Firm* — Ference & Associates LLC

(57) ABSTRACT

This invention provides a device for measuring precipitation by means of radar, comprising an antenna adapted to transmit and receive radar waves and a dielectric lens, the antenna being oriented to the dielectric lens such that radar waves radiated from the antenna pass through the dielectric lens. Furthermore, it is provided a method of determining a velocity of raindrops by radar, comprising the steps of: radiating a radar signal by means of an antenna, receiving a reflected radar signal by said antenna and determining the velocity of the raindrops based on the received reflected radar signal wherein a dielectric lens is disposed in front of the antenna such that the radiated radar signal passes through the dielectric lens.

20 Claims, 2 Drawing Sheets

(51) Int. Cl.
*G01S 13/58* (2006.01)
*H01Q 1/42* (2006.01)
*H01Q 19/06* (2006.01)
*H01Q 21/06* (2006.01)

(52) U.S. Cl.
CPC ......... *H01Q 19/062* (2013.01); *H01Q 21/065* (2013.01); *Y02A 90/10* (2018.01)

(56) References Cited

U.S. PATENT DOCUMENTS

| | | | | |
|---|---|---|---|---|
| 5,481,268 | A * | 1/1996 | Higgins | G01S 7/032 342/111 |
| 5,587,713 | A * | 12/1996 | Pfizenmaier | G01S 7/032 342/70 |
| 6,757,445 | B1 * | 6/2004 | Knopp | G01C 11/06 382/154 |
| 8,345,716 | B1 * | 1/2013 | Ehret | H04B 7/10 455/562.1 |
| 10,276,929 | B2 * | 4/2019 | Meyer | H01Q 1/3283 |
| 2005/0093738 | A1 | 5/2005 | Nagasaku et al. | |
| 2006/0097907 | A1 * | 5/2006 | Fischer | G01S 13/958 342/26 R |
| 2008/0074338 | A1 * | 3/2008 | Vacanti | H01Q 25/002 343/771 |
| 2009/0174596 | A1 * | 7/2009 | Gekat | G01S 7/024 342/26 R |
| 2010/0001900 | A1 * | 1/2010 | Imai | G01S 13/951 342/195 |
| 2010/0026607 | A1 | 2/2010 | Imai | |
| 2010/0321262 | A1 * | 12/2010 | Pohl | H01Q 15/08 343/753 |
| 2014/0139370 | A1 * | 5/2014 | Hamner | G01S 13/4463 342/175 |
| 2015/0192671 | A1 * | 7/2015 | Zhang | G01S 13/95 342/188 |

FOREIGN PATENT DOCUMENTS

WO 2007074943 A1 7/2007
WO 2013055272 A1 4/2013

OTHER PUBLICATIONS

Microwaves101.com, Fundamentals of EM Waves, "far field" definition https://web.archive.org/web/20150104041539/https://www.microwaves101.com/encyclopedias/fundamentals-of-em-waves (Year: 2015).*
International Search Report issued for corresponding International Patent Application No. PCT/EP2016/075157 dated Jul. 5, 2017 (English language translation attached).
Written Opinion issued for corresponding International Patent Application No. PCT/EP2016/075157 dated Jul. 5, 2017 (English language translation not attached).
Matthew James Kemp: "A FM-CW microwave radar for rainfall applications", Master Thesis, May 31, 2012 (May 31, 2012), XP055385708, Gefunden im Internet: URL:http://ir.uiowa.edu/cgi/viewcontent.cgi?article=3061&context=etd (gefunden am Jun. 27, 2017) Seiten 2, 3, 19, 2; Abbildungen 2, 4-6, 14, 15.
Mansheim T J et al: "A Robust Microwave Rain Gauge", IEEE Transactions on Instrumentation and Measurement, IEEE Service Center, Piscataway, NJ, US, Bd. 59, Nr. 8, Aug. 1, 2010 (Aug. 1, 2010), Seiten 2204-2210, XP011296747, ISSN: 0018-9456 Sections II.A-II.C; Abbildungen 1-3.

* cited by examiner

_US 11,867,804 B2_

APPARATUS AND METHOD FOR MEASURING PRECIPITATION

FIELD OF INVENTION

The invention concerns a device and a method for measuring precipitation.

PRIOR ART

Current radar precipitation sensors are based on the principle of a Doppler radar with a separate transmit and receive paths. In the so-called bi-static radar systems, electromagnetic waves in the radio frequency range are transmitted as so-called primary signal bundled together by means of a first antenna. The echoes reflected by objects are then received as a secondary signal by a second antenna spatially separated from the first antenna. From the displacement of the frequency of the reflected signal due to the Doppler effect, the relative movement between the transmitter/receiver system and the objects can then be calculated.

During precipitation measurement, the velocities of raindrops are measured with the aid of such a Doppler radar. Since there is a fixed relationship, i.e. a positive correlation, between the velocity and the diameter of the raindrops, the diameter and volume of a drop can be inferred from the measured velocity. Signal evaluations can also be used to determine whether a drop hits the radome of the radar or whether it passes it. If all drops with their corresponding volumes are counted which hit the radome, a precipitation quantity can be determined which has fallen in relation to the reference surface of the radome.

Bistatic radar precipitation sensors of the art have a number of disadvantages.

Due to the small radar cross-sections of raindrops, the antennas must be placed closely below the radome surface in order to keep the distance to the raindrop as small as possible. At the same time, the antennas require a large aperture angle, e.g. 40°×60°, in order to have as large a part of the radome as possible in the field of view. This ensures that the sample quantity of the hitting raindrops detected is large enough to enable to determination of the total precipitation quantity and intensity. If a drop hits the edge of the radome, the measured velocity $v_{measured}$ is reduced to the value $$v_{measured} = v_{Drop} \frac{1}{2} (\cos \alpha_{TX} + \cos \alpha_{RX}) \quad (1)$$

The corresponding situation is shown in FIG. 1a. The figure shows a transmission antenna 110 and a reception antenna 120 of a radar precipitation sensor, which are arranged closely below the surface of the radome 130. FIG. 1a also shows a raindrop 101, which strikes the edge of the radome 130 at the velocity of $v_{Drop}$. The primary radar signal transmitted by the transmission antenna 110 detects the drop 101 at an angle $\alpha_{TX}$ to the direction of movement of the drop 101. The reflected secondary signal (echo) is received by the reception antenna 120 at an angle $\alpha_{RX}$ to the direction of movement of the drop 101. Since both angles are larger than 0°, the measured velocity $v_{measured}$ according to Formula 1 is less than the actual velocity $v_{Drop}$ of raindrop 101.

The bi-static precipitation radar with separate transmission and reception antennas also leads to falsified measurements of the drop velocity under the influence of wind. The correlation of drop velocity and drop diameter results from a combination of gravitational force and flow resistance of the drop. In addition to acceleration by gravity, raindrops can also be accelerated by the influence of winds, as shown in FIG. 1b. If a drop is accelerated by the influence of wind in such a way that it flies obliquely towards the antennas, the superposition of the two velocities is measured. For example, the raindrop 102 shown in FIG. 1b was accelerated to a horizontal velocity $v_{measured}$ by the wind, while it was accelerated to a vertical velocity $v_{Gravitation}$ by gravity. From the superposition of these two velocities the velocity of the drop $v_{Drop}$ results, with which the raindrop 102 strikes the surface of the radome 130. The resulting velocity is thus higher than the velocity caused by gravity. As a result, the measured velocity is also generally higher than the velocity caused by gravity, such that a too large raindrop is erroneously deduced. Therefore, the quantity of precipitation under the influence of wind is also overestimated.

As shown in Formula 1, the separate transmission and reception paths result in a bi-static Doppler shift. As a result, the velocity of the raindrop is measured as too low, even if the drop 103, as shown in FIG. 1c, strikes the center of the radome 130. The effect is not negligibly small because the distance between the transmission and reception antennas is not negligibly small compared to the distance between raindrops and the respective antenna. As shown in Formula 1, the measured velocity is reduced to a value smaller than the actual velocity $v_{Drop}$ of the raindrop 103.

In view of these problems of the art, one of the objects of the present invention is to provide a device and method for measuring precipitation by radar which measure the actual quantity of precipitation with high precision. In addition, the device should have a good signal-to-noise ratio and be compact.

DESCRIPTION OF THE INVENTION

The above objects are addressed by a device for measuring precipitation by means of radar comprising an antenna adapted to transmit and receive radar waves and a dielectric lens, the antenna being oriented to the dielectric lens such that radar waves radiated from the antenna pass through the dielectric lens. Unlike the bi-static state-of-the-art radars described above, the present invention is a monostatic precipitation radar in which the same antenna is used both to transmit the radar waves, i.e. the primary signals, and to receive the reflected radar waves, i.e. the secondary signals. In particular, the device can have exactly one antenna, which serves simultaneously as transmission and reception antenna.

Transmission and reception antennas for radar waves are well known in the art and are therefore not described in detail here. It should only be mentioned that the antenna can be designed with a sufficiently large aperture angle in order to have a sufficiently large part of the radome in the field of view for the precipitation measurement. In order to achieve a reflection of the transmitted primary signals at raindrops, the antenna can be dimensioned for the transmission and reception of radio waves according to suitable frequencies. For example, the antenna can be adapted to transmit and receive radio waves with a frequency in the NATO K band, for example 24 GHz, in the NATO J band or the NATO L band. Here, the antenna dimensions are in the centimeter or sub-centimeter range.

According to the invention, a dielectric lens is arranged in front of the antenna in the direction of radiation, wherein the antenna is oriented to the dielectric lens in such a way that radar waves emitted by the antenna pass through the dielectric lens. In particular, the antenna can be oriented to and spaced from the dielectric lens in such a way that the radar waves emitted by the antenna substantially, i.e. with the exception of manufacturing tolerances, entirely hit the dielectric lens. This can be achieved, for example, by placing a conic circular waveguide between the antenna and the dielectric lens. However, a part of the emitted radar waves can also be radiated past the dielectric lens. By using a single antenna to transmit and receive the radar waves, a common transmission and reception path of the radar system is obtained. In particular, the difference between the viewing angles at which a raindrop with respect to separate transmission and reception antennas strikes the radome is eliminated. The resulting Doppler shift is thus a monostatic Doppler shift, which avoids the reduction of the measured velocity of the bi-static Doppler shift described above.

In a dielectric lens, parallel radio waves hitting the dielectric lens, are focused in a point, the focal point, according to the refraction of optical lenses. The material of the dielectric lens can be chosen according to the application for the above mentioned radar waves. For the dielectric material forming the dielectric lens, resin, ceramic, a resin-ceramic composite, an artificial dielectric material with metal cyclically arranged in it, a photon crystal and other materials having a specific dielectric constant other than 1 can be used. At a radio frequency of 24 GHz, for example, a dielectric lens with a relative dielectric constant of 3.11 and a loss factor of 0.0015 can be used. Preferably, the dielectric lens can be made of a material that is approximately loss-free for the radar waves used.

According to a further embodiment, the dielectric lens can be adapted to and oriented relative to the antenna in such a way that wave fronts radiated by the antenna are transformed into essentially plane wave fronts as they pass through the dielectric lens. This can be achieved by appropriate choice of shape and/or variation of the dielectric constant of the dielectric lens. For example, the dielectric lens may be a convex lens with a constant dielectric constant within the lens. However, the dielectric constant can also vary depending on a radial distance from the (optical) axis of the lens. This can also be the case with shapes other than convex, such that spherical wave fronts emitted by the antenna are transformed into substantially plane wave fronts as they pass through the dielectric lens. Here, an essentially plane wave front is defined as a wave front along whose extent the direction of the wave vector varies by less than 10°. In particular, the dielectric lens can be rotationally symmetrical about its optical axis, but asymmetrical forms are also conceivable, which take into account an asymmetrical beam angle of the antenna. Furthermore, the dielectric lens can be designed as a zone lens which, similar to a Fresnel zone plate, concentrically arranges zones of different path lengths around the optical axis of the lens. The only decisive factor is that the dielectric lens has at least one lens surface refracting the radar waves and is formed and arranged with respect to the antenna in such a way that spherical wave fronts radiated by the antenna are transformed into plane wave fronts as they pass through the dielectric lens.

According to a further embodiment, the antenna may be located at a focal point of the dielectric lens, the antenna being oriented to radiate in the direction of the dielectric lens. In particular, a central axis or symmetry axis of the radiation characteristics of the antenna may be aligned with the optical axis of the dielectric lens. In this case, spherical wave fronts radiated by the antenna are transformed into plane wave fronts when passing through the dielectric lens which after passing through the dielectric lens run parallel to the principal planes of the lens and propagate in an orthogonal direction along the optical axis of the dielectric lens.

The dielectric lens thus focuses the radar waves that are reflected by the raindrops. Radar waves reflected by raindrops further away are also sufficiently focused on the antenna, resulting in a good signal-to-noise ratio. In addition, the propagation of the transmitted radar waves in the form of plane wave fronts after passing through the dielectric lens causes the Doppler shift by backscattering of the raindrops to be measured independently of the angle at which the raindrops hit the radome with respect to the antenna. The influence of this viewing angle on the measured velocity can thus be easily eliminated.

Alternatively, a circular waveguide can be arranged between the antenna and the dielectric lens, which is adapted to guide the radar waves between the antenna and the lens. In particular, the circular waveguide can be in direct contact with the dielectric lens at its end remote from the antenna wherein the dielectric lens can be semi-convex, for example, in order to guarantee an optimized coupling of the emitted radar waves into the dielectric lens. The circular waveguide can have a diameter corresponding to the lens diameter. The antenna-side opening of the circular waveguide is oriented to the antenna in such a way that the radiated power is essentially coupled into the circular waveguide. If a circular waveguide is used, the above-described arrangement of the antenna with respect to the optical axis of the dielectric lens can be dispensed with, so that the shape of the device can be flexibly adapted to the respective requirements.

According to a further embodiment the antenna can be designed as a patch antenna. Such a patch antenna can be designed as a single patch antenna in the form of a rectangular metal surface whose longitudinal side has a length corresponding to half the wavelength of the radar waves used. With a single patch antenna, which can be aligned perpendicular to the optical axis of the dielectric lens, radar waves can be emitted and received in an extremely compact way. As described above, the patch antenna, in particular, with its geometric center, can be arranged in a focal point of the dielectric lens. Alternatively, a 1×2 patch array can be used as it has a rotationally symmetrical 90° aperture angle. The antenna formed with a 1×2 patch array can be placed with its antenna center of gravity in the focus of the dielectric lens. The antenna center of gravity is defined as the center of gravity of the emitted Poynting flux and in this case does not correspond to the geometric center, but is slightly shifted with respect to it. In particular, the patch antenna can be spaced from the dielectric lens in such a way that the spherical wave fronts emitted by the patch antenna hit the dielectric lens completely.

The device may also include a radome located on the far side with respect to the antenna of the dielectric lens and partially enveloping the dielectric lens. For example, the radome may be built in the form of a hollow hemisphere or in the form of a hollow truncated cone, which may also be connected to a cylinder, the radome and cylinder together enclosing the precipitation measurement device, including the signal processing unit described below. The cylinder can be conical. The radar waves pass through the truncated cone. This ensures that the radome retains the plane character of the wave front. The radome is made of a substantially loss-free material that is permeable to the transmitted radar waves. The radome protects the underlying antenna, dielectric lens and electronics from moisture and dirt on the one hand, and forms the impact surface for the raindrops on the other.

The device can also include a ring coupler for decoupling reception and transmission signals. Since a single antenna is used for transmitting and receiving the radar waves, the transmission and reception paths of the precipitation measurement device according to the invention are coupled to each other. By using a ring coupler, also known as a rate-race coupler, the received signal can be separated by interference from the combined reception and transmission signal at the monostatic antenna connector by superposition with the transmission signal.

According to a further embodiment, the inventive device may further include a signal processing unit for processing radio frequency signals adapted to generate a transmission signal for the antenna and to determine a Doppler shift based on a reception signal from the antenna. The transmission signal may be continuous when the device is used as a continuous wave radar sensor or pulsed when the device is used as a pulse radar sensor. In addition, the transmission signal may be unmodulated (CW—continuous wave). In particular, the antenna and signal processing unit can be adapted to emit a coherent radio signal to measure the Doppler shift. The signal processing unit can determine the Doppler shift from the change in frequency between the transmitted signal and the received signal.

Signal generators for radar antennas are generally known in the art. In particular, signal generation can be carried out with the aid of an upward mixer, which combines an auxiliary frequency with an intermediate frequency to generate the desired high frequency for radiation by the antenna. Equivalently, the signal processing unit can have a down mixer which combines the received high frequency with the auxiliary frequency of the local oscillator to convert the received frequency to a lower, and thus easier to process, intermediate frequency.

The signal processing unit can also be adapted to determine the phase information from the received radar signal according to the I/Q method (in-phase and quadrature method). For this purpose, the signal processing unit may have an MTI (moving target indication) circuit. The Doppler shift can then also be calculated from the temporal change of the phase information. Since the device for precipitation measurement according to the invention is a monostatic radar system, both methods can be used equally to determine the Doppler shift.

The signal processing unit may also include other elements such as analog-to-digital converters, digital-to-analog converters, other mixers, a digital signal processor and/or other elements known in the art. The signal processing unit can also generate differential I-Q signals from the transmission signal and the received signal.

According to a further embodiment, the signal processing unit can also be adapted to determine precipitation from the Doppler shift and a correlation of velocity and size of raindrops. For this purpose, the signal processing unit can have or be connected to a memory unit in which the correlation of velocity and size of raindrops is stored, for example, in the form of a table. The velocity of the raindrops can be determined by the signal processing unit on the basis of known laws from the Doppler shift and the known frequency of the emitted primary signal. The velocity can also be determined directly from the temporal change of the phase information as described above. Accordingly, the signal processing unit described above can be adapted to determine the velocity of the raindrops directly on the basis of a reception signal of the antenna.

According to a further embodiment, the signal processing unit may have a monolithic microwave integrated circuit (MMIC). All active and passive components of the used high frequency circuits can be realized on a semiconductor substrate. The monolithic integrated microwave circuit can, for example, be implemented in the form of a dual counter clock mixer with field effect transistors, a so-called Gilbert cell. In addition to the particularly compact design of the monolithic integrated microwave circuit, such a Gilbert cell suppresses the AM noise of the local oscillator and also ensures good isolation of the cell gates. In addition, no distributed circuit elements are required. An MMIC implementation for differential signal routing is especially simple and space-saving.

According to a further embodiment, the dielectric lens with its optical axis can essentially be aligned in the direction of the gravitational force. This is particularly advantageous if the antenna is arranged in a focal point of the dielectric lens as described above and is aligned along the optical axis with an axis of symmetry of the emitted radar wave field. In this case, due to the substantially plane wave front, the vertical velocity component of the raindrops is always measured in full size after passing through the dielectric lens, even if the drops strike the edge of the radome. This independence from the point of impact of the raindrops results from the anti-parallelism of the vertical velocity component to the direction of propagation of the plane wave front.

Furthermore, the substantially plane wave front causes that the horizontal velocity component of the raindrops caused by the influence of wind is not measured, or only in a greatly reduced form. The elimination of the influence of the wind results from the orthogonality of the horizontal velocity component to the direction of propagation of the plane wave front.

This invention also provides a device for measuring precipitation by radar with an antenna adapted to transmit and receive radar waves, the antenna comprising a two-dimensional array of patch antennas arranged such that in the far field substantially plane waves can be emitted from the antenna. In particular, the antenna may comprise an array of N×M identically formed patch antennas, wherein N≥10 and M≥10. The antennas can be arranged in a regular field, i.e. at a constant distance with respect to each other. Such a two-dimensional array of patch antennas has a high directivity with negligible side lobes.

If the amplitude and the phase of the individual control currents for the antennas of the array are selected appropriately, such a two-dimensional array of patch antennas transmits a substantially plane wave front after interference, i.e. in the far field, at least over the propagation range of the antenna field. By means of a two-dimensional array of patch antennas arranged in one plane, an essentially plane wave front can be generated without the use of a dielectric lens, which leads to a more precise measurement of the velocity of falling raindrops as described above. In contrast to the devices described above, this embodiment does not focus the reflected radar waves and, thus, the signal-to-noise ratio is lower.

The two-dimensional array of patch antennas can be combined with any of the above-mentioned embodiments that do not explicitly require the presence of the dielectric lens.

The described devices can be installed as part of a precipitation measurement system at a fixed location, e.g. on a motorway or in the rainforest. The above-mentioned optical axis of the dielectric lens is, in this case, preferably aligned in the direction of the gravitational force. The precipitation sensors described can also be equipped with a memory for storing the measured precipitation quantities and/or a transmitter device for transmitting the measured precipitation quantities to a central (weather) station.

The above-mentioned objects are also addressed by a method of determining a velocity of raindrops by radar, comprising the steps of: radiating a radar signal by means of an antenna; receiving a reflected radar signal by said antenna; and determining the velocity of the raindrops based on the received reflected radar signal; wherein a dielectric lens is disposed in front of the antenna such that the radiated radar signal passes through the dielectric lens.

Here, the same variations and embodiments described above in connection with the inventive device for precipitation measurement can also be applied to the method of measuring precipitation. In particular, the antenna can be designed as a single patch antenna or as a patch antenna with a 1×2 patch array. The dielectric lens can be partially enclosed by a radome to protect it from contamination. The dielectric lens can be designed and arranged relative to the antenna in such a way that wave fronts of the radar signal radiated by the antenna are transformed into essentially plane wave fronts as they pass through the dielectric lens. The emitted radar signal can be a continuous radar wave with a constant, predetermined frequency or a high-frequency signal modulated onto a carrier wave with a predetermined frequency. The radar signal can also be a pulsed signal. As described above, the antenna can be located in a focal point of the dielectric lens and aligned with a central axis of emission characteristic along the optical axis of the dielectric lens. After passing through the dielectric lens, thereby, plane wave fronts are created which are aligned parallel to the principal planes of the dielectric lens and propagate perpendicular to them.

According to an embodiment, the method can also include the determination of the quantity of precipitation on the basis of the determined velocity. As described above, to determine the velocity of the raindrops, the received radar signal can be mixed downwards and processed by the I/Q method to determine the phase information of the signal. The velocity of the reflecting raindrops can then be calculated from the temporal variation of the phase information. Alternatively, the Doppler shift can be determined by comparing the frequencies of the reception and transmission signals, from which the relative velocity can be determined given that the frequency of the transmission signal is known. Here it must be taken into account that the Doppler effect occurs twice due to the reflection of the radar signal at the raindrops.

According to an embodiment the determination of the velocity of the raindrops can include a separation of the transmitted radar signal and the reflected radar signal by means of a ring coupler. In this way, the transmission and reception paths can be easily combined. As described above, the reception signal can be processed by a signal processing unit, e.g. a monolithic integrated microwave circuit, to determine the velocity of the raindrops and their diameter. A correlation between velocity and diameter of the raindrops can be read out from a memory unit or evaluated as a functional correlation. The quantity of precipitation can then be determined from the diameter of the raindrops that hit the radome and the cross-sectional area of the radome. The individual determination steps can be performed by the signal processing unit and/or a separate processor unit.

The described devices and methods allow a precise and reliable determination of the quantity of precipitation, wherein falsifying influences of wind and impact position of the raindrops are eliminated. The precipitation radar is also extremely compact and can therefore be used simply and space-saving in a wide variety of locations.

Further features and exemplary embodiments of advantages of the present invention are explained in more detail below on the basis of the drawings. It goes without saying that the embodiments do not exhaust the scope of this invention. It further goes without saying that some or all of the features described below can also be combined in other ways.

DETAILED DESCRIPTION

Figure 1A:
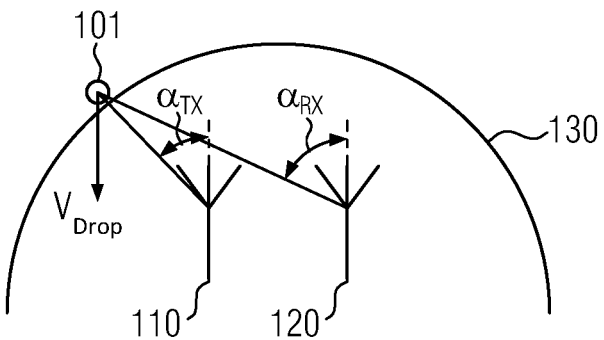
FIGS. 1A-C shows exemplarily the occurring falsifying influences on the measured velocity of raindrops by using a bi-static radar sensor of the state of the art.
Figure 1B:
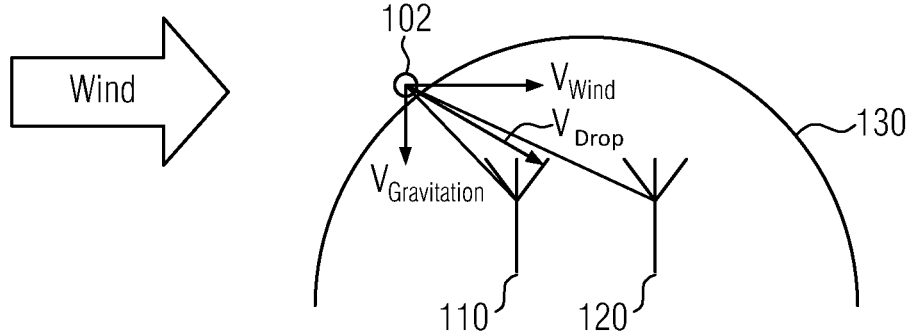
Figure 1C:
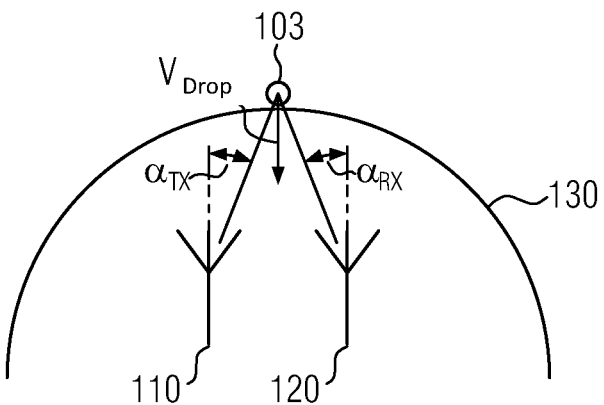
Figure 2:
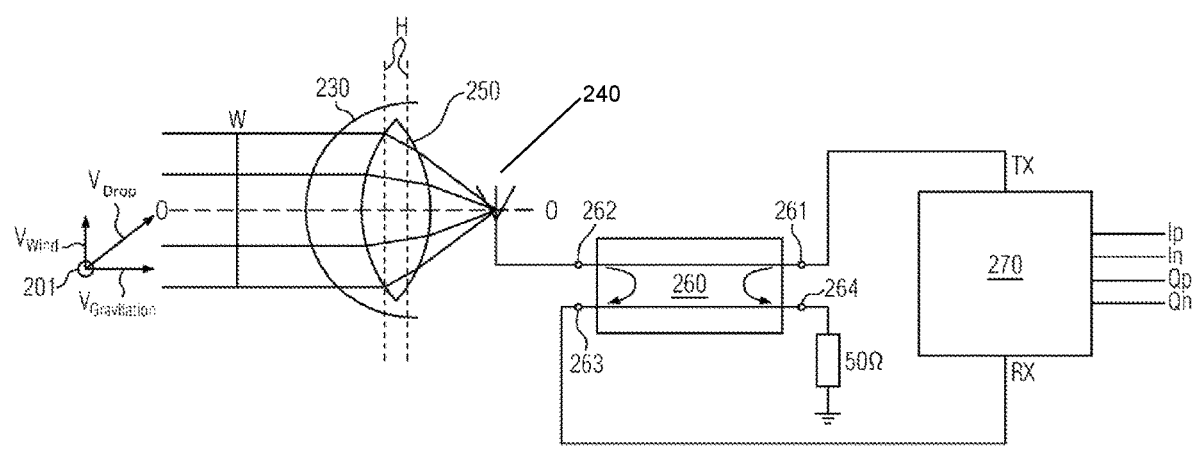
FIG. 2 schematically shows an exemplary embodiment of a device for measuring precipitation according to the invention.

FIG. 2 schematically shows an exemplary embodiment of a device for the measurement of precipitation by radar according to the present invention. The figure shows the device lying on its side for illustration purposes. Preferably, however, the device may be oriented in such a way that the optical axis O of the dielectric lens 250 is aligned with the direction of the gravitational force, as indicated in the figure by the velocity component $v_{Gravitation}$, as is desirable with a permanently installed precipitation radar. In addition, the figure shows the ring coupler 260 and the monolithic microwave integrated circuit 270 in greatly enlarged form. It goes without saying, however, that the ring coupler 260, the MMIC 270 and other required elements together with the dielectric lens 250 and the patch antenna 240 can be accommodated in a cylinder (not shown) closed by the radome 230 as a compact component.

As described above, the inventive device has a 250 dielectric lens placed between the 230 radome and the 240 antenna, the 240 antenna serving for simultaneously transmitting and receiving radar signals. In the non-limiting embodiment shown here, the patch antenna 240 is located in a focal point of the dielectric lens 250. However, the antenna 240 can also be located in another point of the focal plane of the dielectric lens. In this case, the plane wave front propagates obliquely to the optical axis after passing through the dielectric lens.

As shown in FIG. 2, the dielectric lens 250 is adapted and arranged with respect to the antenna 240 in such a way that spherical wave fronts emitted by the antenna 240 are transformed into plane wave fronts W after passing through the dielectric lens. The plane wave fronts W propagate parallel to the principal planes H of the dielectric lens 250. In other words, parallel radar beams are focused on the patch antenna 240 as they pass through the dielectric lens 250. Thus, the radar signals emitted by the antenna 240 hit the falling raindrops 201 as parallel beams. When the optical axis O of the dielectric lens 250 is aligned in the direction of the gravitational force, only the velocity of fall $v_{Gravitation}$ of the raindrops 201 due to gravity contributes to the Doppler shift when the radar signals are reflected by the raindrops. The horizontal component $v_{Wind}$ of the total velocity $v_{Drop}$ of the raindrops caused by a possible influence of the wind has no influence on the Doppler shift of the radar signals that are reflected back to the patch antenna 240.

Since the emitted radar wave propagates after passing through the dielectric lens in the form of plane wave fronts, the radar signals reflected by the raindrops are also reflected back as parallel beams to the dielectric lens 250, which focuses the beams on the patch antenna 240 as shown in FIG. 2. Due to the plane wave fronts, the measured velocity, on the one hand, is no longer influenced by the location where the raindrop 201 strikes the radome. On the other hand, focusing the reflected radar signals causes an improvement of the signal-to-noise ratio.

The radar signal TX to be emitted is generated by a monolithic integrated microwave circuit (MMIC) 270 in the non-limiting embodiment shown here and supplied to a first gate 261 of the ring coupler 260. Since only one patch antenna 240 is used for transmitting and receiving in the monostatic low-hit radar shown here, the primary signal TX and the received secondary signal RX, which are simultaneously present at gate 262, must be decoupled from each other. This is done by means of the ring coupler 260, at whose gate 263 the received secondary signal RX is decoupled by interference. The decoupled secondary signal RX is then forwarded to an input of the MMIC 270 for further processing. The fourth gate 264 of the ring coupler 260 is not required and can be connected to a 50Ω ground connection as shown in FIG. 2. It goes without saying, however, that the shown version of this connection is only an exemplary further embodiment, which can be adjusted to the high-frequency circuit according to the requirements.

As described above, the received secondary signal RX, alone or taking into account the primary signal TX, can be processed by the signal processing unit 270. In particular, the phase information can be determined from the secondary signal RX, as indicated by the differential signal outputs in the figure. The differential signals can be used for analog signal processing because they are insensitive to common-mode interference. Furthermore, the signal to noise ratio (SNR) of the differential signals (e.g. Ip−In), which are provided by MMIC anyway, is greater than the SNR of a single signal (e.g. Ip only). From the temporal variation of the phase information of the secondary signal, the velocity $v_{Gravitation}$ of the raindrops can be directly determined. Alternatively, the velocity $v_{Gravitation}$ of the raindrops can be indirectly determined from the Doppler shift, which can be determined by frequency comparison of the secondary signal with the primary signal. In both cases it has to be considered that due to the reflection of the emitted radar wave a doubling of the effect occurs. The data required to convert the Doppler shift into a velocity $v_{Gravitation}$ can be stored in a memory unit, e.g. a flash memory (not shown), and read out by the MMIC 270 or a separate processor unit (not shown).

From the determined velocity of the raindrops the quantity of precipitation can be determined by the correlation between velocity and diameter of raindrops. If the precipitation quantity is determined in a given time interval, for example 15 seconds, in regular intervals, for example 1 minute, then the temporal variation of the precipitation quantity per time unit can be determined. The data required for the correlation can also be stored in the storage unit. The required algorithms can be executed by the processor unit.

The shown formation of a precipitation radar with dielectric lens and monostatic antenna avoids all disadvantages of a bi-static precipitation radar and allows for a compact and reliable determination of the precipitation quantity.

The invention claimed is:

1. A device for measuring precipitation using radar, comprising:
an antenna adapted to transmit and receive radar waves, wherein the antenna is a single antenna;
a dielectric lens; and
wherein the antenna is oriented to the dielectric lens such that radar waves radiated from the antenna pass through the dielectric lens, wherein the antenna receives a reflected radar signal from the precipitation through the dielectric lens which focuses a plurality of parallel beams of the reflected radar signal to the antenna, wherein the antenna comprises a monostatic radar in which the antenna radiates the radar waves and the antenna receives the reflected radar signal each sharing a common path reducing a viewing angle of the precipitation with respect to the radiation of the radar waves and the receipt of the reflected radar signal, wherein an amount of precipitation is determined based upon a monostatic Doppler shift in which an interference in the reflected radar signal is separated by superposition with the radiated radar waves, and a correlation between velocity and size of the precipitation.

2. The device according to claim 1, wherein the dielectric lens is adapted and oriented relative to the antenna such that wave fronts radiated by the antenna are transformed into substantially planar wave fronts as they pass through the dielectric lens.

3. The device according to claim 2, wherein the antenna is formed as a patch antenna.

4. The device according to claim 2 further comprising a radome disposed on, with respect to the antenna, the remote side of the dielectric lens and partially enveloping the dielectric lens.

5. The device according to claim 1, wherein the antenna is disposed at a focal point of the dielectric lens or a circular waveguide is disposed between the antenna and the dielectric lens.

6. The device according to claim 5, wherein the antenna is formed as a patch antenna.

7. The device according to claim 5 further comprising a radome disposed on, with respect to the antenna, the remote side of the dielectric lens and partially enveloping the dielectric lens.

8. The device according to claim 1, wherein the antenna is formed as a patch antenna.

9. The device according to claim 1 further comprising a radome disposed on, with respect to the antenna, the remote side of the dielectric lens and partially enveloping the dielectric lens.

10. The device according to claim 1 further comprising a ring coupler for decoupling reception signals and transmission signals.

11. The device according to claim 1, further comprising a signal processing unit for processing radio frequency signals and adapted to generate a transmission signal for the antenna and to determine a Doppler shift based on a reception signal of the antenna.

12. The device apparatus according to claim 11, wherein the signal processing unit is further adapted to determine a precipitation quantity from the Doppler shift and a correlation of velocity and size of raindrops.

13. The device according to claim 11, wherein the signal processing unit comprises a monolithic microwave integrated circuit.

14. The device according to claim 1, wherein the dielectric lens is oriented with its optical axis substantially in the direction of gravitational force.

15. A device for measuring precipitation using radar, the device comprising:
- an antenna adapted to transmit and receive radar waves, wherein the antenna comprises a two-dimensional array of patch antennas arranged such that in the far field substantially plane waves can be emitted from the antenna, wherein the antenna is a single antenna;
- wherein the antenna is oriented to the dielectric lens such that radar waves radiated from the antenna pass through the dielectric lens, wherein the antenna receives a reflected radar signal from the precipitation through the dielectric lens which focuses a plurality of parallel beams of the reflected radar signal to the antenna, wherein the antenna comprises a monostatic radar in which the antenna radiates the radar waves and the antenna receives the reflected radar signal each sharing a common path reducing a viewing angle of the precipitation with respect to the radiation of the radar waves and the receipt of the reflected radar signal, wherein an amount of precipitation is determined based upon a monostatic Doppler shift in which an interference in the reflected radar signal is separated by superposition with the radiated radar waves, and a correlation between velocity and size of the precipitation.

16. A method of determining a velocity of raindrops by radar, comprising:
- radiating a radar signal from an antenna through a dielectric lens disposed in front of the antenna, wherein the antenna is oriented to the dielectric lens such that radar waves radiated from the antenna pass through the dielectric lens, wherein the antenna is a single antenna;
- receiving a reflected radar signal by the antenna, wherein the antenna receives the reflected radar signal from the raindrops through the dielectric lens which focuses a plurality of parallel beams of the reflected radar signal to the antenna; and
- determining the velocity of the raindrops based on the received reflected radar signal, wherein the antenna comprises a monostatic radar in which the antenna radiates the radar waves and the antenna receives the reflected radar signal each sharing a common path reducing a viewing angle of the precipitation with respect to the radiation of the radar waves and the receipt of the reflected radar signal, wherein an amount of precipitation is determined based upon a monostatic Doppler shift in which an interference in the reflected radar signal is separated by superposition with the radiated radar waves, and a correlation between velocity and size of the precipitation.

17. The method according to claim 16, wherein the dielectric lens is formed and oriented relative to the antenna such that wave fronts of the radar signals radiated from the antenna are transformed into substantially planar wave fronts as they pass through the dielectric lens.

18. The method according to claim 16, further comprising determining a precipitation quantity based on the determined velocity of the raindrops.

19. The method according to claim 18, wherein determining the velocity of the raindrops comprises separating the radiated radar signal and the reflected radar signal from each other using a ring coupler.

20. The method according to claim 18, wherein determining the velocity of the raindrops comprises separating the radiated radar signal and the reflected radar signal from each other using a ring coupler.

* * * * *